US012718478B2

(12) United States Patent
Mulligan et al.

(10) Patent No.: US 12,718,478 B2
(45) Date of Patent: Aug. 25, 2026

(54) VIRTUAL ENVIRONMENT GUIDING METHOD AND SYSTEM

(71) Applicant: Sony Interactive Entertainment Inc., Tokyo (JP)

(72) Inventors: Paul Terence Mulligan, London (GB); Mark Anthony, London (GB); Jun Yen Leung, London (GB); Richard Carter, London (GB)

(73) Assignee: Sony Interactive Entertainment Inc., Tokyo (JP)

(*) Notice: Subject to any disclaimer, the term of this patent is extended or adjusted under 35 U.S.C. 154(b) by 59 days.

(21) Appl. No.: 18/661,916

(22) Filed: May 13, 2024

(65) Prior Publication Data

US 2024/0386666 A1 Nov. 21, 2024

(30) Foreign Application Priority Data

May 17, 2023 (GB) ..................................... 2307340

(51) Int. Cl.

| | |
|---|---|
| ***A63F 13/45*** | (2014.01) |
| ***A63F 13/52*** | (2014.01) |
| ***A63F 13/5375*** | (2014.01) |
| ***G06T 7/70*** | (2017.01) |
| ***G06T 17/00*** | (2006.01) |

(52) U.S. Cl.

CPC .............. *G06T 17/00* (2013.01); *A63F 13/52* (2014.09); *A63F 13/5375* (2014.09); *G06T 7/70* (2017.01)

(58) Field of Classification Search

CPC ........................... A63F 13/79; A63F 2300/305

USPC ......................................................... 345/419

See application file for complete search history.

(56) References Cited

U.S. PATENT DOCUMENTS

| | | | | |
|---|---|---|---|---|
| 9,233,309 | B2 * | 1/2016 | Gallizzi | A63F 13/497 |
| 10,406,437 | B1 | 9/2019 | Scheurwater | |
| 2005/0090302 | A1 | 4/2005 | Campbell | |
| 2009/0094535 | A1 | 4/2009 | Bromenshenkel | |
| 2021/0299580 | A1 * | 9/2021 | Chow | A63F 13/86 |
| 2022/0335720 | A1 * | 10/2022 | Chang | H04N 5/2224 |

FOREIGN PATENT DOCUMENTS

| | | |
|---|---|---|
| GB | 2558693 A | 7/2018 |

OTHER PUBLICATIONS

Combined Search and Examination Report for corresponding Application No. GB2307340.6, 10 pages, dated Nov. 15, 2023.

* cited by examiner

*Primary Examiner* — Samantha (Yuehan) Wang

(74) *Attorney, Agent, or Firm* — Kilpatrick Townsend & Stockton LLP

(57) ABSTRACT

There is provided a method of guiding a user within a virtual environment in a current session. The method includes receiving data relating to user interactions with the virtual environment of a plurality of other users in a plurality of previous sessions, where a predetermined event occurred in user interactions of each of the other users; determining a representative user position, in the virtual environment, of the other users during the previous sessions; and generating a visual indicator, within the virtual environment in the current session, of the representative user position to guide the user within the virtual environment in the current session.

14 Claims, 2 Drawing Sheets

VIRTUAL ENVIRONMENT GUIDING METHOD AND SYSTEM

BACKGROUND OF THE INVENTION

Field of the Invention

The present invention relates to a method and system for guiding a user within a virtual environment.

Description of the Prior Art

Modern virtual environments can be very complex and feature rich. Users interacting with such environments often encounter difficulties in achieving their objectives in the environment. For example, users playing a video game may struggle to complete a particular scenario or mission in the game.

To address this issue, it is known to provide pre-scripted hints to such struggling users to help guide them in the environment—for example, it is known to display a text box explaining to the user what actions they should take to complete a mission in a game. However, this approach can, in some instances, have several drawbacks. For example, these hints may be difficult to follow for some users, and a particular hint may not be applicable to all users. Further, such hints can obscure part of the environment, and reading the hint may distract the user from the interaction with the environment. All these issues may result in worsening of the user experience and reduced engagement of the user with the environment, and may in some cases cause users to stop interacting with the environment. In addition, scripting, processing and displaying hints that cover a wide range of difficulties a user may encounter is typically resource and time consuming.

The present invention seeks to mitigate or alleviate these problems, and to provide techniques for improved guidance of a user in a virtual environment.

SUMMARY OF THE INVENTION

Various aspects and features of the present invention are defined in the appended claims and within the text of the accompanying description and include at least:

In a first aspect, a method of guiding a user within a virtual environment in a current session is provided that comprises: receiving data relating to user interactions with the virtual environment of a plurality of other users in a plurality of previous sessions, wherein a predetermined event occurred in user interactions of each of the other users; determining a representative user position, in the virtual environment, of the other users during the previous sessions, wherein determining the representative user position includes: determining, from the received data, a respective user position, in the virtual environment of different ones of the other users when the predetermined event occurred; and determining, based at least in part on aggregating the respective user positions of at least two of the other users, the representative user position; and generating a visual indicator, within the virtual environment in the current session, of the representative user position to guide the user within the virtul environment in the current session.

In another aspect, a system for guiding a user within a virtual environment in a current session is provided that comprises: a communication processor configured to receive data relating to uer interactions with the virtual environment of a plurality of other users in a plurality of previous sessions, wherein a predetermined event occurred in user interactions of each of the other users; a determination processor configured to determine a representative user position, in the virtual environment, of the other users during the previous sessions, wherein determining the representative user position includes: determining, from the received data, a respective user position, in the virtual environment, of different ones of the other users when the predetermined event occurred; and determining, based on at least in part on aggregating the respective user positions of at least two of the other users, the representative user position; and an outer procesor configured to generate a visual indicator, within the virtual environment in the current session, of the representative user position to guide the user within the virtual environment in the current session.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

A method and system for guiding a user within a virtual environment are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

In an example embodiment of the present invention, a suitable system and/or platform for implementing the methods and techniques herein may be an entertainment device such as the Sony® PlayStation 5® videogame console.

Figure 1:
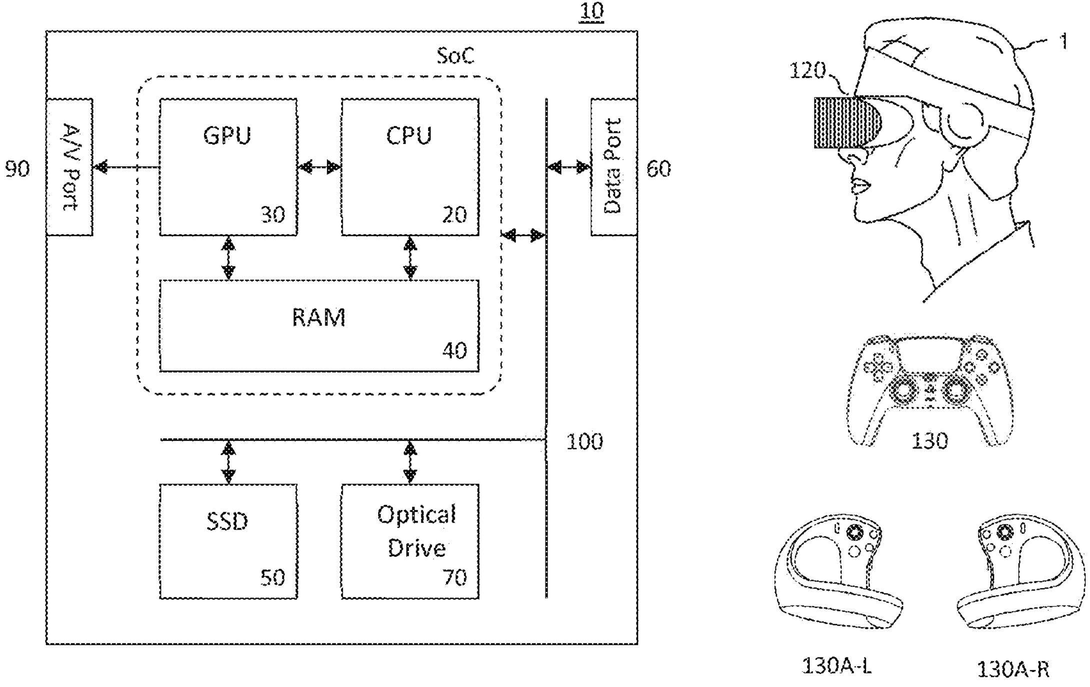
FIG. 1 is a schematic diagram of an entertainment system.

Referring now to the drawings, wherein like reference numerals designate identical or corresponding parts, FIG. 1 shows an example of an entertainment system 10 which is a computer or console such as the Sony® PlayStation 5® (PS5).

The entertainment system 10 comprises a central processor 20. This may be a single or multi core processor, for example comprising eight cores as in the PS5. The entertainment system also comprises a graphical processing unit or GPU 30. The GPU can be physically separate to the CPU, or integrated with the CPU as a system on a chip (SoC) as in the PS5.

The entertainment device also comprises RAM 40, and may either have separate RAM for each of the CPU and GPU, or shared RAM as in the PS5. The or each RAM can be physically separate, or integrated as part of an SoC as in the PS5. Further storage is provided by a disk 50, either as an external or internal hard drive, or as an external solid state drive, or an internal solid state drive as in the PS5.

The entertainment device may transmit or receive data via one or more data ports 60, such as a USB port, Ethernet® port, Wi-Fi® port, Bluetooth® port or similar, as appropriate. It may also optionally receive data via an optical drive 70.

Audio/visual outputs from the entertainment device are typically provided through one or more A/V ports 90, or through one or more of the wired or wireless data ports 60.

An example of a device for displaying images output by the entertainment system is a head mounted display 'HMD' 120, such as the PlayStation VR 2 'PSVR2', worn by a user 1. It will be appreciated that the content may be displayed using various other devices—e.g. using a conventional television display connected to A/V ports 90.

Where components are not integrated, they may be connected as appropriate either by a dedicated data link or via a bus 100.

Interaction with the system is typically provided using one or more handheld controllers (130, 130A), such as the DualSense® controller (130) in the case of the PS5, and/or one or more VR controllers (130A-L,R) in the case of the HMD.

Embodiments of the present disclosure relate to methods and systems for guiding a user within a virtual environment. By determining a representative user position in the virtual environment of other users in previous sessions in which a predetermined event occurred (e.g. in which other users succeeded in a predetermined scenario in the environment), and generating a visual indicator of this determined position within the user's current session in the virtual environment, the present techniques allow guiding the user in the current session in an intuitive manner. The visual indicator provides an easy to grasp indication to the user of how other users in previous sessions positioned themselves and, based on what events occurred in those sessions, the user in the current session can intuitively gauge what position in the virtual environment they should take up. For example, the visual indicator may show to the user in the current session where previous users who were successful/unsuccessful in a scenario in the environment positioned themselves and the user can follow/avoid those positions.

The present disclosure is particularly applicable to guiding a user within a video game environment. It will be appreciated that typically a video game is played by many tens or hundreds of thousands of users, and cumulatively may be played by millions. Consequently, the users' respective recorded statistics relating to events (e.g. successes, or failures), position, and behaviours can be collated and analysed to determine what positions and behaviours correlate with desirable events (e.g. success), in order to guide the user in the current session without the need to create pre-scripted hints (although of course these can still be provided if desired).

By generating the guiding visual indicator automatically based on historical data from other users' interactions, the present invention provides a more efficient method of guiding users in virtual environments (than e.g. existing systems that require developers to pre-script hints). In particular, since the guidance is generated automatically, the present techniques can be efficiently applied to generate guidance for a wide variety of environments and users to efficiently generate personalised advice for each current user-typically much more than a developer would be able to pre-script hints for. Likewise, personalised guidance can be provided depending on the peripheral device used by each current user to interact with the environment (e.g. a controller vs mouse and keyboard) and/or the device that renders the environment (e.g. processing power or latency of a gaming console that renders the environment). Thus, the guidance provided to users can be generated in real-time to reflect the current user context (e.g. the user's level in a game, and the peripheral used by the user). The guidance to users can also be updated dynamically throughout the lifetime of the content without a need for further developer input by considering historical data, thereby allowing the guidance to be more adaptable in response to player innovation and the like. For instance, strategies for succeeding in a scenario in the environment that were not foreseen by developers can be identified by analysing historical data from other users' interactions.

Further, by generating the visual indicator within the virtual environment, the present disclosure allows improving the balance between displaying the environment at a large scale while also providing guidance to the user. In other words, the present invention allows making more efficient use of the limited screen size by displaying the visual indicator directly within the virtual environment (e.g. as an overlay at the corresponding determined user position), thus allowing the virtual environment to be rendered at a larger scale whilst still providing intuitive guidance to the user.

For the purposes of explanation, a non-limiting example of the disclosure may be illustrated with reference to a user's encounter with a monster within a current session in a video game. In this illustrative example, the user is having difficulty beating this monster. The encounter may be a one-off scenario that the user has failed to complete, or this monster may be of a type regularly encountered but where the user has relative difficulty beating the monster.

This difficulty may be automatically detected for example by measuring the time taken between initially engaging with the monster and defeating it, and/or measuring the number of weapon strikes made against the monster and/or measuring the amount of health damage taken by the user (i.e. the user's character) during the battle with the monster, and/or the number of times the user has died battling the monster. These measurements can be considered indicators for the user's relative success or failure in battling the monster. Other measurements will be apparent to the skilled user, and different measurements may be suitable for different scenarios. These measurements may therefore provide indicators of success of the user in the current session in a scenario in the virtual environment (such as fighting the monster in this illustrative example). For example, a user taking more than a predetermined period of time (e.g. 20 minutes) to complete the scenario, or failing to complete to the scenario (e.g. dying when fighting the monster) more than a predetermined number of times (e.g. 5) may indicate that the user is struggling with the scenario.

Figure 2:
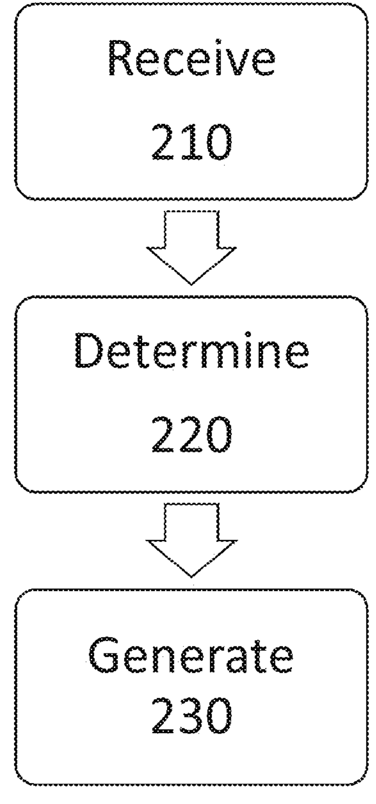
FIG. 2 is a flow diagram of a guiding method.

FIG. 2 shows an example of a method of guiding a user within a virtual environment in a current session in accordance with one or more embodiments of the present disclosure. As described in further detail below, this method includes determining a corresponding user position in the virtual environment during interactions of other users in previous sessions in which a predetermined event occurred (e.g. in which other users succeeded in a predetermined scenario in the environment), and generating a visual indicator of this determined position within the user's current session in the virtual environment to guide the user in the current session.

As used herein, the term "event" preferably connotes an event that occurs to the user in the virtual environment. An event may provide an indication of a user's progress in the virtual environment (e.g. a user's progress in a scenario in the environment). In some cases, the term "event" may connote an outcome of the user interaction with the virtual environment, and/or a condition being satisfied during the user interaction with the virtual environment. Thus, an "event" may be a passive event/outcome in the virtual environment that indicates progress of the user in the virtual environment, as opposed to an action actively performed by the user. For example, in the present example, an event may be a user succeeding in at least partly beating the monster (e.g. reaching a checkpoint where the monster's 'health' is halved, or completely beating the monster), or failing to beat the monster generally (e.g. the user being killed by the monster) or within a predetermined period of time (i.e. the user taking too long to beat the monster).

As used herein, the term "session" preferably connotes a continuous period of time over which a user interacts with the virtual environment. A session may commence when a user begins interacting with the virtual environment, and end when the user stops interacting with the environment (e.g. when the user exits the environment). In the present illustrative example, a session is a game session, and the game session preferably commences when the user starts playing the game (e.g. starts a mission in a game) and ends when the user stops playing the game (e.g. the game ends or the user exits the game).

It will be appreciated that the term "virtual environment" relates to a corresponding instance of the environment for a particular user. Accordingly, the user and other users may interact with different instances of the virtual environment in the current and previous sessions respectively. In the present illustrative example, the virtual environment is a video game environment.

Referring back to FIG. 2, a step 210 comprises receiving (e.g. from a remote server) data relating to user interactions with the virtual environment of a plurality of other users in a plurality of previous sessions. This data may comprise data relating to one or more events that occurred in each of the user interactions in previous sessions. For example, in the user's encounter with the monster, the received data may indicate the events that occurred to the user during the fight with the monster—such as whether the user succeeded or failed to beat the monster, or whether the user reached certain checkpoints in fighting the monster (e.g. depleted half the monster's health).

In some cases, the data received at step 210 may also comprise data relating to the position of the user in the virtual environment in each of the user interactions. Alternatively, this position data may be fetched at step 220, as discussed in further detail below.

The data received at step 210 comprises data relating to user interactions of a plurality of other users in a plurality of previous sessions. Using such 'crowdsourced' data allows discerning representative trends in the data across the plurality of user interactions and sessions, and so providing improved advice and guidance to the user in the current session.

It will be appreciated that a given session may involve a plurality of user interactions with the environment. For example, for a video game environment of a multiplayer game, the data received at step 210 may comprise data relating to interactions of each of the users in a given game session.

A step 220 comprises determining, based on the data received at step 210, a representative user position in the virtual environment of the other users during user interactions in which a predetermined event occurred. This may comprise identifying user interactions in which the event occurred, retrieving user position data for the identified interactions, and determining a representative user position across the interactions. In some cases, determining the representative user position may comprise aggregating the retrieved user position data to determine an aggregate user position in the identified interactions.

Considering identifying user interactions in previous sessions, this may comprise processing the data received at step 210 to identify user interactions in previous sessions in which the predetermined event occurred.

The predetermined event may be pre-selected by the system, or selected by the user (e.g. amongst a list of events). The event selected as the predetermined event may be an event that provides an indication of whether user actions in the corresponding previous interaction/session should be followed or avoided by the current user. For example, the predetermined event may be a user success in a scenario in the virtual environment (e.g. a user succeeding in beating the monster, or unlocking a trophy) in which case the user in the current session may be guided so as to follow this successful user. Alternatively, the predetermined event may be a user failure in a scenario in the virtual environment (e.g. a user dying while fighting the monster) in which case the user in the current session may be guided so as to avoid mistakes made by this unsuccessful user. It will be appreciated that a user success/failure in a scenario may relate to success/failure in the user interaction as a whole (e.g. completing a mission in a game) or in part of the user interaction (e.g. reaching a certain checkpoint in the mission).

In some cases, user interactions may be identified further based on one or more characteristics of the virtual environment in the current session and/or one or more characteristics of the current user in the current session. Thus, previous interactions in which the predetermined event occurred and in which the characteristics of the corresponding user and/or environment are similar to those of the current user and environment may be identified, and a representative user position for these interactions may be determined. This allows providing more personalised and accurate guidance to the current user as they can gain insights on how similar users in similar environments positioned themselves. In addition, this allows efficiently generating such personalised guidance for a wide range of users and environments from historical data from previous user sessions, without requiring pre-scripted hints to be created.

Relevant characteristics of the virtual environment may include one or more of: a difficulty level of a scenario in the virtual environment (e.g. a difficulty level in a video game, or mission thereof), a branch of events in the virtual environment followed by the user (e.g. in videogames, a user may choose one of a plurality of courses of action which each results in a different 'branch' of subsequent events in the environment), and/or one or more items and/or characters in the environment (e.g. different types of monsters the user is fighting in the environment).

Relevant characteristics of the user may include one or more of: a level of the user (e.g. a level of the character controlled by the user in a video game), one or more items of the user (e.g. one or more weapons of the user), one or more statistics of the user (e.g. a health level of the user), and/or a type of character controlled by the user (e.g. a wizard or archer-type character).

The similarity between characteristics of the environment and the user in the current session and previous sessions may be assessed based on empirically determined measures of similarity. For instance, two users' levels may be determined as similar if the levels differ by less than a predetermined threshold number of levels (e.g. two).

Thus, for example, previous user interactions may be identified in which the level of difficulty is the same as for the current user, and the previous users' have a similar level and hold similar items. The current user can then be provided with personalised guidance that is specifically applicable to their current circumstances.

In some cases, similarly to identifying previous users with similar characteristics, previous users with one or more similar indicators of success may be identified. For example, previous users who, at the stage in the interaction of the current user, had a similar indicator of success may be identified, so that the current user is provided with guidance that is applicable to their current level of success (e.g. how other users who at that stage in the interaction had similar indicators of success were ultimately able to beat the monster).

Similarly, in some cases, identifying user interactions may be in dependence on one or more characteristics of a device used to render the virtual environment (i.e. the 'rendering device') in the current session (e.g. characteristics of the entertainment device 10) and/or characteristics of a peripheral device used by the user to interact with the virtual environment in the current session (e.g. characteristics of the controllers 130, 130A-L, R, or HMD 120).

Relevant characteristics of the rendering device may include one or more of: a model of rendering device (e.g. a Sony® PlayStation 5®, or Sony® PlayStation 4®), a display mode in which the virtual environment is rendered (e.g. whether the environment is rendered for Virtual Reality (VR), or for a conventional display), processing resources of the rendering device (e.g. CPU and/or GPU resources), a latency for rendering the environment (e.g. for an online environment), and/or one or more characteristics of a display for the rendered environment (e.g. size, or resolution of the display).

Relevant characteristics of the peripheral device may include one or more of: a type of peripheral device (e.g. a controller, HMD, or a keyboard and mouse), a model of peripheral device (e.g. a DualSense® controller), and/or one or more characteristics of the input elements of the peripheral device (e.g. the sensitivity of a mouse or joysticks on a controller).

In this way, user interactions may be identified where other users used a similar rendering device and/or a similar peripheral device to the current users. This allows providing further personalised guidance to the user as different rendering devices and peripheral devices may lead themselves to different styles of interaction with the environment. For example, users playing a game using a controller (e.g. the controller 130) may have different playstyles to users using HMD peripherals (e.g. the HMD 120 and controllers 130A-L,R) or to users using a keyboard and mouse, and different playstyles may be appropriate to succeed in a scenario in the environment (e.g. to beat the monster) using each peripheral. Similarly, different playing strategies may be appropriate depending on the latency of the rendering device—e.g. some strategies that can be used with low latency may be impractical or difficult to execute when the latency is higher. Considering retrieving user position data, data may be retrieved from the system itself (e.g. the entertainment device) and/or a remote (e.g. cloud) server, as appropriate. The user position data may comprise the user position in the virtual environment (e.g. corresponding coordinates in the environment) at one or more time points in the respective user interaction/session. For example, the user position data may comprise the user position in the virtual environment at the time when the predetermined event occurred in the respective user interaction-such as user position at the time the event of user failure in a scenario in the environment occurred. For instance, in the illustrative example, the user position data may comprise the positions of users in previous sessions in the environment at which the respective users died fighting the monster (i.e. at which a 'death' event occurred). These positions can then be displayed to the user in the current session via a visual indicator to guide them to avoid these positions, as discussed in further detail below.

Alternatively, or in addition, the user position data may comprise user position in the virtual environment at a plurality of time points in the respective user interactions. This allows determining a path of a previous user in the virtual environment during at least part of the user's interaction, which the user in the current session can be guided to follow or avoid as appropriate.

The user position data for retrieving may be determined based on several factors, such as one or more of: the predetermined event (based on which the user interactions were identified), one or more user settings, and/or one or more indicators of success of the current user in the current session in a scenario in the virtual environment. For instance, these factors may affect the number and timing (i.e. time points in the user interaction) of user position data points that are retrieved.

For example, when the predetermined event is a user failure in a scenario in the environment (e.g. the user dying in fighting the monster), user position at the time the event occurred (e.g. the death location) may be retrieved. Alternatively, when the predetermined event is a user success in the scenario (e.g. the user beating the monster), a plurality of user positions in the interaction up to the time of the event may be retrieved, so as to determine the path of the previous, successful, user in the environment.

In some cases, the amount of user position data that is retrieved may depend on the indicators of success of the current user in the current session. For example, the amount of retrieved user position data may increase as the indicators of success of the current user decrease, and vice versa. This allows improving the balance between guiding the user and processing cost, and improving the user's engagement with the environment, as the user is provided with more guidance (i.e. more historical user position data is fetched) if the user continues to struggle to complete the scenario (e.g. beat the monster), but is not provided with excessive guidance which might reduce engagement with the scenario. For example, when retrieving data relating to the previous user's path in the environment up to the event, the sampling rate of user position may be increased when an indicator of success of the current user falls below a predetermined threshold to provide more precise guidance to the current user on where they should position themselves in the environment.

Considering determining a representative user position, this may comprise aggregating the user position data from the user interactions of a plurality of previous users in a plurality of previous sessions to determine an aggregate user position in the virtual environment across the user interactions. This allows discerning representative trends in the data across the plurality of user interactions and sessions, and thus providing improved guidance to the current user in the current session.

Aggregating the user position data may comprise performing one or more statistical operations on the user position data. For example, this may comprise determining a mean or average user position across the previous user interactions in which the predetermined event occurred. Alternatively, or in addition, this may comprise determining one or more most frequent user positions amongst the previous user interactions, optionally to a predetermined precision level (e.g. with positions distant by less than a predetermined distance being considered the same)—e.g., the 5 positions at which previous users most commonly died while fighting the monster.

Alternatively, or in addition, aggregating the user position may comprise determining a distribution of user position across the previous user interactions. The distribution of user position may be discretised into buckets, e.g. of 1 $m^2$ in the virtual environment. This may provide a measure of relative correlation between the predetermined event and user position across the sessions—which, as discussed in further detail below, allows providing particularly useful and intuitive user guidance in the current session. For example, if there is only one previous session in which a given event occurred when the user was at a particular position, this may be a coincidence and is not necessarily indicative of a correlation between the event and position. In contrast, if there are a plurality (e.g. 100, or 1000) of such sessions, then the position of previous users in those sessions is more likely to be correlated with the event (e.g. the user's death fighting the monster), and the current user can be effectively guided by user position in those plurality of sessions (e.g. to avoid the positions where a plurality of previous users have died).

The statistical operations may be performed in the spatial and/or time domain. For example, the average user position may be a spatial average position (e.g. average user position along the length of user paths in previous sessions), or a time average position (e.g. average user position at time points in previous sessions).

Alternatively to aggregating the user position, determining the representative user position may comprise identifying one or more users that are representative of the plurality of other users, and outputting the position of these one or more users in their respective sessions. For example, a previous user whose position is closest to the average position of the other users may be selected as a representative user. Alternatively, or in addition, a previous user may be selected as a representative user based on one or more user characteristics (e.g. user level in a game). In some cases, two or more users may be selected as representative users—e.g. the two or more users with levels around the median user level across the plurality of users may be selected as representative.

In some cases, the representative user position may be determined in dependence on the duration of the current session and/or the current user's progress in a scenario in the environment. For example, the representative user position may be determined based on user positions of other users who, in their respective sessions, have made similar progress (e.g. reached the same checkpoint) in a similar amount of time (e.g. the difference between the current user's and the respective other user's session times to get to that checkpoint being below a predetermined threshold) to the current user and/or to each other. This allows providing the current user with yet more relevant guidance. For example, the current user may be able to follow the user path of a previous other user who took a similar amount of time to get to the stage in the interaction at which the current user is currently at. Alternatively, or in addition, the representative user position may be determined based on user positions of a group of previous users who behaved similarly (and so e.g. their average position provides a more accurate indication of how the current user may position himself).

In some cases, step 220 may output the corresponding user position of a plurality of previous users during interactions in which the predetermined event occurred. This allows displaying to the user the positioning of a plurality of particular previous users in previous interactions, so that the current user may, e.g., have the choice to follow one of previous users which succeeded in a scenario in the environment (e.g. who beat the monster). In some cases, the data received at step 210 may already be pre-filtered to previous user interactions in which the predetermined event occurred, and identifying these user interactions may not be necessary at step 220. Similarly, in some cases, the data received at step 210 may already comprise the user position data, in which this data need not be retrieved at step 220.

A step 230 comprises generating a visual indicator, within the virtual environment in the current session, of the representative user position determined at step 220 to guide the current user within the virtual environment in the current session. In this way, the current user is provided with a visual indicator of where previous users in whose interactions a given event occurred positioned themselves (e.g. where previous users died fighting the monster) which provides an intuitive guide for the current user on how to position himself in the environment. In addition, this guidance is automatically and efficiently generated based on historical user interaction data without requiring prescripted user hints. Further, the present techniques allow automatically generating context-specific guidance for a wide range of users in a wide range of environments.

The visual indicator may comprise any appropriate indicator (e.g. a graphical feature) that stands out in the virtual environment, such as an object (e.g. skull to indicate a previous user's death), a symbol (e.g. 'x'), or change in shading. It will be appreciated that the visual indicator may be two or three dimensional as appropriate, e.g. for a given virtual environment and virtual camera viewpoint.

The visual indicator may be provided as an overlay at position(s) in the virtual environment corresponding to the previous user position(s) determined at step 220. For example, the visual indicator may be provided as an 'x' symbol overlaid on the virtual environment at a position in the virtual environment where a representative previous user has died when fighting the monster in a previous interaction. This provides an indication to the current user to avoid that position when fighting the monster, and thus guides the user in successfully beating the monster.

Alternatively, or in addition, the visual indicator may be comprise one or more indicators/signs towards the previous user position(s) determined at step 220. For example, the visual indicator may comprise a plurality of arrows pointing towards the determined representative user position(s), so as to guide the user towards (e.g. if the corresponding previous user has succeeded in a scenario in the environment) or away (e.g. if the corresponding previous user has failed in a scenario in the environment) from these determined positions.

In some cases, the visual indicator may be generated in dependence on a distance between the current position of the user in the current session and the previous user position(s) determined at step 220. In an example, the visual indicator may be generated within the virtual environment in the current session based on whether this distance is below or above a predetermined threshold. For example, the visual indicator may be generated if the distance is below a predetermined threshold. This is advantageous as it allows providing the user with guidance regarding positions of previous users that are most relevant to the current user's position. For example, the visual indicator may indicate to the user the positions where previous users died fighting the monster which are closest to the current user so as to guide the user to avoid these positions. Alternatively, or in addition, the visual indicator may be generated if this distance is above a further predetermined threshold.

It will be appreciated that whether the visual indicator is generated for distances below or above a given threshold may depend on the predetermined event—for example, the visual indicator may be generated if the distance is below a first threshold for an event of user failure in a scenario (e.g. to warn the current user to avoid the indicated position), or the visual indicator may be generated if the distance is above a second threshold for an event of user success in a scenario (e.g. to guide the current user to return to a 'success' path if they have strayed too far from it).

The visual indicator may be generated in dependence on how the user position in previous interactions was determined at step 220. For example, the visual indicator may be generated based on one or more of: the predetermined event (i.e. the event that occurred in the relevant previous interactions), the number of previous user interactions for which the corresponding user position was determined, the number of user positions (i.e. user position data points) determined for each previous user interaction in which the predetermined event occurred, and/or whether or not the determined user position has been aggregated to determine an aggregate user position.

For instance, if only one user position (i.e. one position data point) is determined for a given previous user interaction, the visual indicator may comprise an indicator (e.g. a graphical feature such as an 'x' symbol) at (e.g. as an overlay at) positions corresponding to the retrieved data point for each interaction. In turn, if a plurality of user positions are determined for a given previous user interaction, the visual indicator may comprise a plurality of indicators that show the previous user's path between the plurality of user positions—for example, a breadcrumb trail of the previous user's path. In some cases, a previous user's path in an interaction may be interpolated between retrieved data points—this allows retrieving a reduced size data set and storing less data.

In some cases, a visual indicator of a representative user path (e.g. of a given representative previous user or an average amongst users) may include one or more indicators of the previous user(s) speed along the path (i.e. movement along the path). For example, the visual indicator may indicate where the representative user whose path is displayed sprinted, slowed down (e.g. entered 'stealth' mode), or stopped so that the current user can imitate these movements.

Likewise, in cases where user positions in a plurality of previous user interactions are output at step 220, the visual indicator may differ depending on whether the previous user positions are aggregated.

For example, in cases where the previous user positions are not aggregated, the visual indicator may comprise an indicator of corresponding user position in the previous user interactions. In some cases, an indicator of user position in each of the previous user interactions may be generated. Alternatively, indicators for only a subset of the previous user interaction may be generated. In some examples, the user interactions for which a visual indicator is generated may be selected based on a distance between the current position of the user in the current session and the determined user position. For example, the visual indicator may display locations at which a predetermined number of (e.g. 5) previous users have died fighting the monster for previous users that are closest to the current position of the user in the current session. In this way, the user is provided with guidance and advice that is most relevant to their current position in the environment—e.g. the current user can be guided to avoid locations where other users have died that are closest to the current user. It will be appreciated that the selection of previous user interactions may be regularly updated (e.g. every 10 frames) to reflect changes in the current user's position.

In cases where the previous user positions are aggregated, the visual indicator may be generated in a different manner in dependence on how the positions were aggregated. For instance, where previous user positions were aggregated by determining a distribution of user position across the multiple previous user interactions, the visual indicator may comprise a visualisation of this distribution—for example, a histogram, plot, or heat map of the distribution. Providing the visual indicator as a heat map can be advantageous because it provides intuitive and easy to grasp feedback to the user as to how many previous users were at a given position and so indicates how relevant that position is—e.g. if many users have previously died at a given location fighting the monster then the current user will intuitively understand that they should particularly avoid this location. In turn, where previous positions were aggregated by determining an average user position, then a visual indicator of that average user position can be generated in the same way as a visual indicator of a user position in a given previous interaction as described elsewhere herein.

In some cases, in addition to indicating the user position determined at step 220, the visual indicator may indicate the predetermined event. For example, one or more features of the indicator may differ depending on the predetermined event. Such features may, e.g., include the colour, symbol or brightness of the visual indicator. For instance, a red, skull-shaped, and dim visual indicator may indicate that the predetermined event was a user's failure in a scenario (e.g. death fighting the monster), whereas a white, bright, and heart-shaped indicator may indicate that the predetermined event was a user's success in the scenario. The features of the visual indicator corresponding to each predetermined event may be selected based on a predetermined mapping between events and indicator features.

In some cases, the visual indicator may be generated in dependence on one or more indicators of success of the current user in a scenario in the virtual environment. This allows preventing cheating by users and improving the user's engagement with the virtual environment as the user is able to first attempt the scenario and is provided with just enough guidance to allow them to succeed in the scenario (e.g. beat the monster) while keeping the scenario entertaining and engaging. In the present illustrative example, these indicators may comprise one or more indicators of the user's success in fighting the monster-such as, how many times the current user has previously failed to beat the monster, or how long the user has already taken in fighting the monster.

In some examples, one or more features (such as the size, shape, texture, or brightness) of the visual indicator may be modified in dependence on these indicators of success. The indicators of success provide a measure of the difficulty faced by the current user, and so by adjusting features of the visual indicator based on these indicators, the current user can be provided with an appropriate amount of guidance that allows the user to challenge themselves while improving their chances of succeeding in the scenario. For instance, when the indicators of success fall below a predetermined threshold, the visual indicator may be modified to provide clearer guidance to the current user. For example, an indicator of success may be the amount of time the user has spent trying to complete the scenario—as this time increases (and so the corresponding indicator of success falls), the visual indicator may be modified to increase in brightness or contrast to the virtual environment (e.g. by changing the indicator's colour) so that the user can more easily discern, and more intuitively be guided by, the visual indicator; or, as this time increases, the visual indicator may be modified to reduce its size (e.g. the width of a 'breadcrumb trail' of a successful user) to provide more precise guidance to the user.

Conversely, when the indicators of success exceed a threshold, the visual indicator may be modified so as to make it less visible to, or hidden from, the user so that the user can fully enjoy completing the scenario with reduced, or without any, guidance.

Alternatively, or in addition, it may be determined whether or not to generate the visual indicator based on the indicators of success. For instance, the visual indicator may be generated only if one or more indicators of success are below a predetermined threshold. For example, the visual indicator may be generated upon the current user failing a predetermined number of times (e.g. 5) in the scenario in the environment.

It will also be appreciated that, alternatively or in addition to, the generating step 230, the receiving step 210 and/or the determining step 220 may likewise depend on these indicators of success. For example, the indicators of success of the current user may be evaluated against one or more thresholds before step 210 or 220, and the method may only proceed to step 210 or 220 if one or more indicators of success are below a predetermined threshold.

In some examples, the method described with reference to FIG. 2 above may further comprise determining, for at least one of the user interactions (in which the predetermined event occurred), a user position at which the corresponding previous user performed a predetermined action, and generating one or more further visual indicators, within the virtual environment in the current session, of the user position at which the previous user performed the predetermined action. This allows yet further guiding the current user by providing an indication to the user of what actions previous users took, so that the user may avoid or replicate these actions.

For example, the further visual indicator may indicate to the current user the position at which a previous user, in who's interaction with the environment the predetermined event occurred, executed a particular attack (e.g. used a particular weapon or jumped) or used a particular item (e.g. a healing potion). Depending on the predetermined event in question, the current user may thus be guided to avoid or replicate this action. For instance, if the predetermined event is a user failure in a scenario (e.g. the previous user dying when fighting the monster), the current user may be guided to avoid repeating the mistakes of other users whose actions resulted in them failing in the scenario. Conversely, if the predetermined event is a user success in the scenario (e.g. the user beating the monster), the current user may be guided to repeat actions of the previous successful user.

In some examples, the representative user position may be determined at step 220 and/or the visual indicator may be generated at step 230 based on one or more indicators of success of the corresponding previous users in a scenario in the environment. For example, the user position of a given previous user may only be taken into account in determining the representative user position (and/or the corresponding visual indicator may only be generated) if the previous user's indicators of success exceed a threshold. This improves the guidance provided by the visual indicator as it allows providing guidance based on historical data relating to more successful users. This also helps ensure that the previous users whose position is indicated are a representative sample—e.g. it allows filtering out previous users who did not make a proper attempt at completing the scenario, and so whose position would not be representative and would be of lesser relevance to the current user.

It will be appreciated that the determined representative user position may be dynamic, such that the current user can follow it by following the visual indicator. The representative user position may be representative of 'steps' in achieving a predetermined objective (e.g. succeeding in a scenario in the environment, such as beating the monster). For example, as described elsewhere herein, determining the representative user position may comprise determining a user path of one or more other users and what actions these other users performed, such that as the current user progresses in the environment he can follow the positioning and actions of the other users. As described elsewhere herein, the representative user position may also be regularly updated to provide up to date guidance to the current user.

It will also be appreciated that the method described with reference to FIG. 2 above may be repeated for a plurality of predetermined events and a corresponding visual indicator may be generated for each event. For example, a first visual indicator may be generated for a first predetermined event of user success in a scenario, and a second visual indicator may be generated for a second predetermined event of user failure in the scenario. In this way, the current user is provided with yet further guidance in the virtual environment.

Figure 3:
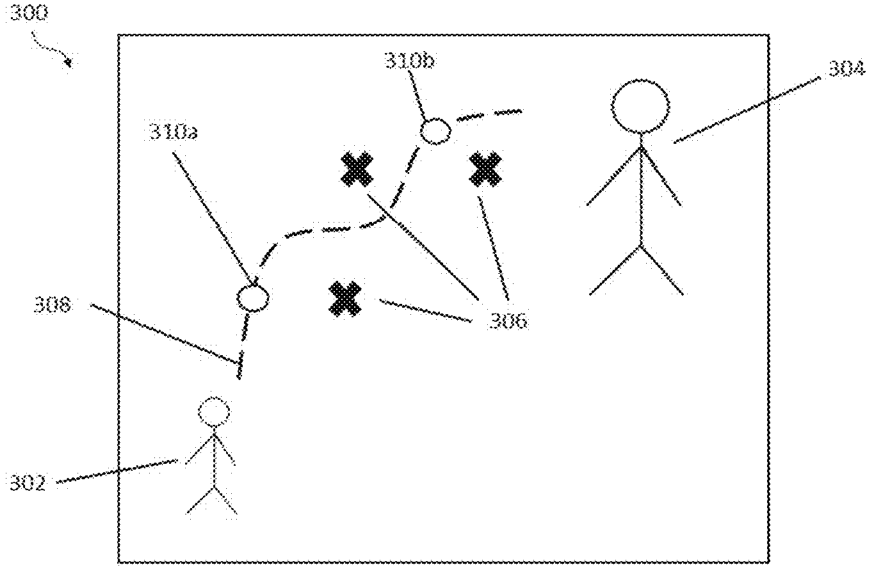
FIG. 3 is a schematic diagram of a virtual environment.

FIG. 3 shows an example virtual environment in the current session including visual indicators generated in accordance with the present techniques. In this illustrative example, the virtual environment 300 comprises a user (i.e. a user-controlled character) 302 and a monster 304 (i.e. a computer-controlled character) that the user 302 is fighting.

The virtual environment 300 further comprises a first visual indicator 306, a second visual indicator 308, and further visual indicators 310*a,b*. These indicators are each provided as an overlay at the corresponding position in the virtual environment. The first visual indicator 306 is generated for a predetermined event of user death fighting the monster, and provides an indication to the user 302 of determined user positions at which users in previous sessions have died fighting the monster. Thus, by means of providing the first visual indicator 306, the user 302 can be guided to avoid positions of the first visual indicator 306.

The second visual indicator 308 is generated for a predetermined event of user success in fighting the monster, and acts as a 'breadcrumb' trail that provides an indication to the user 302 of a determined user path of one or more previous users who have succeed in fighting the monster. Thus, by means of providing the second visual indicator 308, the user 302 can be guided to follow the path of the previous successful users.

The further visual indicators 310*a,b* provide further indications of positions at which the previous successful users (who took a path indicated by the second visual indicator 308) performed certain actions, so as to further guide the current user 302 in their fight with the monster 304. For example, indicator 310*a* may correspond to the average position at which previous successful users used a given item (e.g. a healing potion), and indicator 3010*b* may correspond to the average position at which previous successful users executed a given attack (e.g. used a specific weapon to attack the monster 304).

It will be appreciated that, while the description primarily refers to an illustrative example of a user's fight with a monster, the present disclosure is applicable to guiding a current user in other virtual environments and scenarios. For instance, in an alternative example, the current user may be playing a racing game, the predetermined event may be a failure in completing the race (optionally within a given time), and the visual indicator may provide an indication of positions where previous users have crashed.

Referring back to FIG. 2, in a summary embodiment of the present invention a method of method of guiding a user within a virtual environment in a current session comprises the following steps.

A step 210 comprises receiving data relating to user interactions with the virtual environment of a plurality of other users in a plurality of previous sessions, wherein a predetermined event occurred in user interactions of each of the other users, as described elsewhere herein.

A step 220 comprises determining a representative user position, in the virtual environment, of the other users during the previous sessions, as described elsewhere herein.

A step 230 comprises generating a visual indicator, within the virtual environment in the current session, of the representative user position to guide the user within the virtual environment in the current session, as described elsewhere herein.

It will be apparent to a person skilled in the art that variations in the above method corresponding to operation of the various embodiments of the method and/or apparatus as described and claimed herein are considered within the scope of the present disclosure, including but not limited to that:

- the virtual environment is a video game environment, and each session is a video game session, as described elsewhere herein;
- the determining step 220 comprises determining an aggregate user position in the virtual environment of the other users across the previous sessions, as described elsewhere herein;
- in this case, optionally determining the aggregate user position comprises determining a distribution of user position of the other users in the virtual environment across the previous sessions, and the visual indicator comprises a visualisation of the determined distribution, as described elsewhere herein;
- where, optionally the visual indicator is a heat map of the determined distribution, as described elsewhere herein;
- determining the representative user position is dependent upon one or more characteristics of the user and/or the virtual environment in the current session, as described elsewhere herein;
- determining the representative user position is dependent upon one or more characteristics of a device used to render the virtual environment in the current session, as described elsewhere herein;
- determining the representative user position is dependent upon one or more characteristics of a peripheral device used by the user to interact with the virtual environment in the current session, as described elsewhere herein;
- the determining step 220 comprises, for at least one of the other users, determining a user position at which the corresponding other user performed a predetermined action, as described elsewhere herein;
- in this case, optionally the generating step 230 further comprises generating a further visual indicator, within the virtual environment in the current session, of the position at which the corresponding other user performed the predetermined action, as described elsewhere herein;
- in this case, optionally the predetermined action is an action performed by the other user for progressing (and/or at least partly completing) the predetermined event (e.g. for progressing in a scenario in the virtual environment), as described elsewhere herein;
- the predetermined event comprises a user success in a scenario in the virtual environment, or a user failure in a scenario in the virtual environment, as described elsewhere herein;
- the visual indicator is provided as an overlay at a position in the virtual environment corresponding to the representative user position, as described elsewhere herein;
- the determining step 220 comprises, for user interactions of at least one of the other users, determining user position of the other user in the virtual environment at the time when the predetermined event occurred, as described elsewhere herein;
- the determining step 220 comprises, for user interactions of at least one of the other users, determining a user path in the virtual environment of the other user during at least part of the corresponding previous session, as described elsewhere herein;
- in this case, optionally the user path is a path of the other user in progressing in (and/or at least partly completing) the predetermined event (e.g. in progressing in a scenario in the virtual environment), as described elsewhere herein;
- at least one of the determining step 220 and the generating step 230 is in dependence on one or more indicators of success of the user in a scenario in the virtual environment in the current session, as described elsewhere herein;
- in this case, optionally the representative user position is determined and/or the visual indicator is generated if the one or more indicators of success are below a predetermined threshold, as described elsewhere herein;
- the predetermined event in a user interaction is a predetermined outcome of the user interaction, as described elsewhere herein; and
- the predetermined event in a user interaction is a predetermined condition being satisfied, as described elsewhere herein.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

Hence referring back to FIG. 1, an example conventional device may be the entertainment system 10, in the form of a Sony® PlayStation 5® videogame console. Accordingly, a system 10 for guiding a user within a virtual environment in a current session, may comprise the following.

A communication processor (for example CPU 20) configured (for example by suitable software instruction) to receive data relating to user interactions with the virtual environment of a plurality of other users in a plurality of previous sessions, wherein a predetermined event occurred in user interactions of each of the other users, as described elsewhere herein. A determination processor (for example CPU 20) configured (for example by suitable software instruction) to determine a representative user position, in the virtual environment, of the other users during the previous sessions, as described elsewhere herein. An output processor (for example CPU 20) configured (for example by suitable software instruction) to generate a visual indicator, within the virtual environment in the current session, of the representative user position to guide the user within the virtual environment in the current session, as described elsewhere herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of guiding a user within a virtual environment in a current session, the method comprising:

receiving data relating to user interactions with the virtual environment of a plurality of other users in a plurality of previous sessions, wherein a predetermined event occurred in user interactions of each of the other users;

determining a representative user position, in the virtual environment, of the other users during the previous sessions, wherein determining the representative user position includes:

determining, from the received data, a respective user position, in the virtual environment, of different ones of the other users when the predetermined event occurred; and determining, based at least in part on aggregating the respective user positions of at least two of the other users, the representative user position; and generating a visual indicator, within the virtual environment in the current session, of the representative user position to guide the user within the virtual environment in the current session.

2. The method of claim 1, wherein the virtual environment is a video game environment, and each session is a video game session.

3. The method of claim 1, wherein determining the representative user position comprises determining a distribution of the respective user positions of the other users, and wherein the visual indicator comprises a visualisation of the determined distribution.

4. The method of claim 1, wherein determining the representative user position includes selecting a subset of the plurality of other users for aggregating the respective user positions, wherein the selection is based at least in part on a similarity of one or more characteristics of the user and/or the virtual environment in the current session to corresponding characteristics of the selected other users.

5. The method of claim 1, wherein determining the representative user position includes selecting a subset of the plurality of other users for aggregating the respective user positions, wherein the selection is based at least in part on a similarity of one or more characteristics of a device used to render the virtual environment in the current session to corresponding characteristics of devices used in the previous sessions.

6. The method of claim 1, wherein determining the representative user position includes selecting a subset of the plurality of other users for aggregating the respective user positions, wherein the selection is based at least in part on a similarity of one or more characteristics of a peripheral device used by the user to interact with the virtual environment in the current session to corresponding characteristics of peripheral devices used in the previous sessions.

7. The method of claim 1, wherein the predetermined event comprises a user success in a scenario in the virtual environment, or a user failure in a scenario in the virtual environment.

8. The method of claim 1, wherein the visual indicator is provided as an overlay at a position in the virtual environment corresponding to the representative user position.

9. The method of claim 1, wherein determining the representative user position comprises determining a representative user path in the virtual environment based on respective paths of the two or more of the plurality of other users during at least part of the corresponding previous session.

10. The method of claim 1, wherein at least one of determining the representative user position and generating a visual indicator is in dependence on one or more indicators of success of the user in a scenario in the virtual environment in the current session.

11. The method of claim 1 wherein generating the visual indicator includes:

determining a distance between a current position of the user in the virtual environment and the representative user position; and generating the visual indicator based at least in part on the distance between the current position of the user and the representative user position.

12. The method of claim 11 wherein generating the visual indicator further includes one or more of:

generating a first visual indicator in the event that the distance between the current position of the user and the representative user position exceeds a first predetermined threshold; or generating a second visual indicator in the event that the distance between the current position of the user and the representative user position is below a second predetermined threshold, wherein the first visual indicator and the second visual indicator are visually distinct.

13. A non-transitory, computer readable storage medium containing a computer program comprising computer executable instructions adapted to cause a computer system to perform a method of guiding a user within a virtual environment in a current session, the method comprising:

receiving data relating to user interactions with the virtual environment of a plurality of other users in a plurality of previous sessions, wherein a predetermined event occurred in user interactions of each of the other users;

determining a representative user position, in the virtual environment, of the other users during the previous sessions, wherein determining the representative user position includes:

determining, from the received data, a respective user position, in the virtual environment, of different ones of the other users when the predetermined event occurred; and determining, based at least in part on aggregating the respective user positions of at least two of the other users, the representative user position; and generating a visual indicator, within the virtual environment in the current session, of the representative user position to guide the user within the virtual environment in the current session.

14. A system for guiding a user within a virtual environment in a current session, the system comprising:

a communication processor configured to receive data relating to user interactions with the virtual environment of a plurality of other users in a plurality of previous sessions, wherein a predetermined event occurred in user interactions of each of the other users;

a determination processor configured to determine a representative user position, in the virtual environment, of the other users during the previous sessions, wherein determining the representative user position includes:

determining, from the received data, a respective user position, in the virtual environment, of different ones of the other users when the predetermined event occurred; and determining, based at least in part on aggregating the respective user positions of at least two of the other users, the representative user position; and an output processor configured to generate a visual indicator, within the virtual environment in the current session, of the representative user position to guide the user within the virtual environment in the current session.

* * * * *